(12) United States Patent
Cheng et al.

(10) Patent No.: US 9,684,959 B2
(45) Date of Patent: Jun. 20, 2017

(54) METHODS AND SYSTEMS FOR AUTOMATIC LOCATION OF OPTIC STRUCTURES IN AN IMAGE OF AN EYE, AND FOR AUTOMATIC RETINA CUP-TO-DISC RATIO COMPUTATION

(71) Applicants: AGENCY FOR SCIENCE, TECHNOLOGY AND RESEARCH, Singapore (SG); SINGAPORE HEALTH SERVICES PTE LTD, Singapore (SG)

(72) Inventors: Jun Cheng, Singapore (SG); Jiang Liu, Singapore (SG); Yanwu Xu, Singapore (SG); Fengshou Yin, Singapore (SG); Ngan Meng Tan, Singapore (SG); Wing Kee Damon Wong, Singapore (SG); Beng Hai Lee, Singapore (SG); Xiangang Cheng, Singapore (SG); Xinting Gao, Singapore (SG); Zhuo Zhang, Singapore (SG); Tien Yin Wong, Singapore (SG); Ching-Yu Cheng, Singapore (SG); Yim-lui Carol Cheung, Singapore (SG); Baskaran Mani, Singapore (SG); Tin Aung, Singapore (SG)

(73) Assignees: Agency for Science, Technology and Research, Singapore (SG); Singapore Health Services Pte Ltd, Singapore (SG)

( * ) Notice: Subject to any disclaimer, the term of this patent is extended or adjusted under 35 U.S.C. 154(b) by 0 days.

(21) Appl. No.: 14/423,704

(22) PCT Filed: Aug. 26, 2013

(86) PCT No.: PCT/SG2013/000370
§ 371 (c)(1),
(2) Date: Feb. 24, 2015

(87) PCT Pub. No.: WO2014/031086
PCT Pub. Date: Feb. 27, 2014

(65) Prior Publication Data
US 2015/0187070 A1    Jul. 2, 2015

(30) Foreign Application Priority Data

Aug. 24, 2012 (SG) .............................. 201206302-0

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/0061* (2013.01); *G06K 9/00617* (2013.01);
(Continued)

(58) Field of Classification Search
None
See application file for complete search history.

(56) References Cited

U.S. PATENT DOCUMENTS 7,884,945 B2* 2/2011 Srinivasan ............ A61B 3/102
356/479
8,824,779 B1* 9/2014 Smyth ................. G06K 9/0061
382/100
(Continued)

FOREIGN PATENT DOCUMENTS

WO   WO 2007/118079 A2   10/2007
WO   WO 2007/131140 A2   11/2007
(Continued)

OTHER PUBLICATIONS

PCT Notification of Transmittal of The International Search Report and The Written Opinion of The International Searching Authority, or The Declaration for PCT Counterpart Application No. PCT/SG2013/000370 Containing International Search Report, 10 pgs. (Nov. 13, 2013).

(Continued)

*Primary Examiner* — Weiwen Yang
(74) *Attorney, Agent, or Firm* — Blakely, Sokoloff, Taylor & Zafman LLP

(57) ABSTRACT

A method is proposed for automatically locating the optic disc or the optic cup in an image of the rear of an eye. A portion of the image containing the optic disc or optic cup is divided into sub-regions using a clustering algorithm. Biologically inspired features, and optionally other features, are obtained for each of the sub-regions. An adaptive model uses the features to generate data indicative of whether each sub-region is within or outside the optic disc or optic cup. The result is then smoothed, to form an estimate of the position of the optic disc or optic cup.

20 Claims, 3 Drawing Sheets

(51) Int. Cl.
| | |
|---|---|
| *G06K 9/46* | (2006.01) |
| *G06T 11/20* | (2006.01) |
| *G06K 9/62* | (2006.01) |
| *G06T 7/11* | (2017.01) |
| *G06T 7/62* | (2017.01) |
| *G06T 7/187* | (2017.01) |

(52) U.S. Cl.
CPC ......... *G06K 9/4633* (2013.01); *G06K 9/6269* (2013.01); *G06T 7/11* (2017.01); *G06T 7/187* (2017.01); *G06T 7/62* (2017.01); *G06T 11/203* (2013.01); *G06K 2009/4657* (2013.01); *G06T 2200/28* (2013.01); *G06T 2207/10024* (2013.01); *G06T 2207/20016* (2013.01); *G06T 2207/30041* (2013.01); *G06T 2207/30196* (2013.01); *G06T 2210/41* (2013.01)

(56) References Cited

U.S. PATENT DOCUMENTS

| | | | |
|---|---|---|---|
| 8,958,621 | B2* | 2/2015 | Lee ........................ A61B 3/102 382/131 |
| 2009/0268159 | A1 | 10/2009 | Xu et al. |
| 2010/0196895 | A1 | 8/2010 | Kinoshita et al. |
| 2011/0137157 | A1* | 6/2011 | Imamura ............... G06T 7/0012 600/425 |
| 2013/0222767 | A1 | 8/2013 | Cheng et al. |

FOREIGN PATENT DOCUMENTS

| | | |
|---|---|---|
| WO | WO 2007/131140 A3 | 11/2007 |
| WO | WO 2009/139722 A1 | 11/2009 |
| WO | WO 2010/134889 A1 | 11/2010 |
| WO | WO 2010/138645 A2 | 12/2010 |
| WO | WO 2010/138645 A3 | 12/2010 |
| WO | WO 2011/059409 A1 | 5/2011 |

OTHER PUBLICATIONS

PCT Notification of Transmittal of International Preliminary Report on Patentability for PCT Application No. PCT/SG2013/000370, 20 pgs. (Dec. 11, 2014).

S.G. Vazquez, et al., "Improvements in retinal vessel clustering techniques: towards the automatic computation of the arterio venous ratio," Computing Journal, vol. 90, Issue 3-4, pp. 197-217 (Nov. 2010).

J. Xu, et al., "3D Optical Coherence Tomography Super Pixel with Machine Classifier Analysis for Glaucoma Detection," 2011 Annual International Conference of the IEEE Engineering in Medicine and Biology Society EMBC, pp. 3395-3398 (Aug. 30, 2011).

M.D. Abramoff, et al., "Automated Segmentation of the Optic Disc from Stereo Color Photographs Using Physiologically Plausible Features," Investigative Ophthalmology & Visual Science, vol. 48, No. 4, pp. 1665-1673 (Apr. 2007).

B. Andres, et al., "Segmentation of SBFSEM Volume Data of Neural Tissue by Hierarchical Classification," Proceedings of the 30$^{th}$ DAGM Symposium, Lecture Notes in Computer Science, Munich, Germany, vol. 5096, pp. 142-152 (Jun. 10-13, 2008).

Y. Fengshou, et al., "Extraction of Features from Fundus Images for Glaucoma Assessment," Masters Thesis, National University of Singapore, 2011 [retrieved on Jun. 4, 2014] http://scholarbank.nus.edu.sg/bitstream/handle/10635/29907/YinFS.pdf?sequence=1.

D.W.K. Wong, et al., "Level-set based automatic cup-to-disc ratio determination using retinal fundus images in ARGALI," 30$^{th}$ Annual International Conference of the IEEE Engineering in Medicine and Biology Society (EMBS), Vancouver, Canada, pp. 2266-2269 (Aug. 2008).

I.K. Park, et al., "Fast and automatic object pose estimation for range images on the GPU," Machines Vision and Applications, vol. 21, Issue 5, pp. 749-766 (Aug. 2010).

L. Goldmann, et al., "Towards Fully Automatic Image Segmentation Evaluation," Advanced Concepts for Intelligent Vision Systems, Lecture Notes in Computer Science, vol. 5259, pp. 566-577 (Oct. 2008).

Z. Zhang, et al, "Optic disc region-of-interest localization in fundus image for glaucoma detection in argali," Proc. of Int. Conf. on Industrial Electronics & Applications, pp. 1686-1689 (2010).

F. Yin, et al., "Model-based Optic Nerve Head Segmentation on Retinal Fundus Images," Int. Conf. of IEEE Eng. in Med. and Bio. Soc., pp. 2626-2629 (2011).

A. Fitzgibbon, et al., "Direct least squares fitting of ellipses," IEEE Trans. Pattern Anal. Mach. Intell., vol. 21, No. 5, pp. 476-480 (May 1999).

S. M. Hyung, et al., "Optic disc of the myopic eye: Relationship between refractive errors and morphometric characteristics," J. Ophthalmol., vol. 6, pp. 32-35 (1992).

N.M. Tan, et al., "Automatic detection of pathological myopia using variational level set," Int. Conf. of IEEE Eng. in Med. and Bio. Soc., pp. 3609-3612 (2009).

J. Liu, et al., "Detection of pathological myopia by PAMELA with texture-based features through an SVM approach," Journal of Healthcare Engineering, vol. 1, No. 1, pp. 1-11 (2010).

C. Siagian, et al., "Rapid biologically-inspired scene classification using features shared with visual attention," IEEE Trans. Pattern Anal. Mach. Intell., vol. 29, No. 2, pp. 300-312 (Feb. 2007).

D. Song and D. Tao, "Biologically inspired feature manifold for scene classification," IEEE Trans. Image Processing., vol. 19, No. 1, pp. 174-134 (Jan. 2010).

Y. Mu, et al., "Biologically inspired feature manifold for gait recognition," Neurocomputing., vol. 73, pp. 895-902 (2010).

L. Itti, et al., "A model of saliency-based visual attention for rapid scene analysis," IEEE Trans. Pattern Anal. Mach. Intell., vol. 20, No. 11, pp. 1254-1259 (1998).

J. Lowell, et al., "Optic nerve head segmentation," IEEE Transactions on Medical Imaging, vol. 23, No. 2, p. 256-264 (Feb. 2004).

A. Hoover, et al., "Locating the optic nerve in a retinal image using the fuzzy convergence of the blood vessels," IEEE Trans. on Medical Imaging, vol. 22, No. 8, pp. 951-958 (Aug. 2003).

M. Foracchia, E. Grisan, and A. Ruggeri, "Detection of optic disc in retinal images by means of a geometrical model of vessel structure," IEEE Trans. on Medical Imaging, vol. 23, No. 10, pp. 1189-1195 (Oct. 2004).

European Patent Office Communication enclosing Supplementary European Search Report for corresponding European Patent Application No. 13830919, 14 pp., (Jun. 13, 2016).

(56) References Cited

OTHER PUBLICATIONS

Cattleya Duanggate, et al., "Parameter-free Optic Disc Detection", Computerized Medical Imaging and Graphics, vol. 35, pp. 51-63, (2011).

Brian Fulkerson, et al., "Class Segmentation and Object Localization with Superpixel Neighborhoods", 2009 IEEE 12$^{th}$ International Conference on Computer Vision (ICCV), pp. 670-677, (2009).

Kyungmoo Lee, et al., "Segmentation of the Optic Disc in 3-D OCT Scans of the Optic Nerve Head", IEEE Transactions on Medical Imaging, vol. 29, No. 1, pp. 159-168, (Jan. 2010).

\* cited by examiner

METHODS AND SYSTEMS FOR AUTOMATIC LOCATION OF OPTIC STRUCTURES IN AN IMAGE OF AN EYE, AND FOR AUTOMATIC RETINA CUP-TO-DISC RATIO COMPUTATION

CROSS-REFERENCE TO RELATED APPLICATIONS

This patent application is a U.S. National Phase Application under 35 U.S,C. §371 of International Application No. PCT/SG2013/000370, filed Aug. 26, 2013, entitled METHODS AND SYSTEMS FOR AUTOMATIC LOCATION OF OPTIC STRUCTURES IN AN IMAGE OF AN EYE, AND FOR AUTOMATIC RETINA CUP-TO-DISC RATIO COMPUTATION, which claims priority to Singapore Patent Application No. 201206302-0, filed Aug. 24, 2012.

FIELD OF INVENTION

The present invention relates to a system and a method for using an image of the fundus of an eye to located the optic cup and/or disc, and thereby compute the eye's retina cup-to-disc ratio (CDR).

BACKGROUND OF THE INVENTION

Glaucoma is a chronic eye condition in which the nerve that connects the eye to the brain (optic nerve) is progressively damaged. Patients with early stages of glaucoma do not have visual symptoms. Progression of the glaucoma results in loss of peripheral vision, so patients may complain of vision loss. Although glaucoma cannot be cured, treatments can slow down the progression of the disease. Thus, early detection of glaucoma is critical and beneficial to patients. However, routine screening for glaucoma for the whole population is limited by poor sensitivity of current tests. Screening may be useful for high risk individuals, such as first degree relatives of a glaucoma patient, older individuals (e.g. 65 years and older) and elderly Chinese women (who are at risk of angle closure glaucoma).

There are three current methods to detect glaucoma:
(1) Assessment of raised intraocular pressure (IOP);
(2) Assessment of abnormal visual field; and
(3) Assessment of damage to the optic nerve.

IOP measurement is neither specific nor sensitive enough to be an effective screening tool. Visual field testing requires special equipment only present in tertiary hospitals. Moreover, visual field testing is not sensitive enough to detect early glaucoma damage as these patients do not have visual symptoms.

Assessment of damage to the optic nerve is more promising and superior to IOP or visual field testing. It is performed using a fundus image (that is a two-dimensional image of the rear of the eye composed of intensity values for each of the pixels of the image; there are typically multiple intensity values for each pixel, corresponding to different colour channels). Optic nerve assessment can be done by a trained specialist (ophthalmologist). However, the technique involves manual assessment of the optic disc assessment, which is subjective, and the cost of training an ophthalmologist is high. It is beneficial to develop tools to automatically analyse the optic disc from fundus images for glaucoma screening. The optic disc (OD) is the location where ganglion cell axons exit the eye to form the optic nerve. The localisation and segmentation of OD is very important in many computer aided diagnosis systems such as glaucoma screening. The localisation focuses on finding an OD pixel, very often the centre of the OD. The segmentation estimates the OD boundary. FIG. 1(a) and (d) are two fundus images. FIGS. 1(b) and (e) are derived from FIG. 1(a) and (d) respectively, and the lines marked 1 are the ground truth OD boundaries.

Conventional approaches proposed for. OD segmentation include template-based methods, deformable model-based methods and pixel classification based methods. The first two types of method are on the basis of the edge characteristics. The performance very much depends on the differentiation of edges from OD and other structures especially peripapillary atrophy (PPA), which is present in the area between the lines marked 1 and 2 in FIG. 1(b). As PPA looks similar to OD, it is often mistaken for part of OD. For example, the lines marked 3 in FIG. 1 are the boundary detected by existing OD segmentation algorithms. Deformable models are sensitive to poor initialization. Very often, the deformation cannot exclude PPA from the segmented OD if it has been included in the initialization. A study compared the deformable model-based methods using an active contour with pixel classification based methods and concluded that their performances were similar especially for images without PPA or other pathologies. The results also show that the features used in the pixel classification-based methods were not very effective in differentiating PPA region from OD. Therefore, PPA is the main challenge in performing OD segmentation accurately in all three types of methods. Moreover, pixels are not natural entities and the number of pixels is high even at moderate resolutions, which makes optimization of the level of pixels intractable in pixel classification methods.

A common limitation of existing methods is that they do not generate a measure of the reliability of the segmented result, i.e., these methods give a segmentation without any knowledge of how good or reliable the result is. Thus, the system might produce bad segmentation results without a warning. When the segmented OD is used for further processing, for example, cup segmentation for cup to disc ratio based glaucoma screening, the errors would propagate.

On 12 Oct. 2012, some of the present inventors filed a U.S. patent application Ser. No. 13/651,309, entitled "Methods and Systems for Detecting Peripapillary Atrophy", which was unpublished as of the priority date of the present application. It suggests a method for detecting PPA in which a region of interest in a fundus image is divided into sub-regions, biologically-inspired features (BIF) are extracted for the sub-regions, and an adaptive model is used to generate data indicating whether PPA is present.

SUMMARY OF THE INVENTION

The present invention aims to provide methods and systems for the detection of optic structures (in particular the optic cup and optic disc) within a two-dimensional image of the rear part of the eye. The image is defined by intensity values at each of a set of pixels.

The invention is motivated by the observation that humans demonstrate the ability to capture instantly the 'gist' of an image despite its size, while computers cannot perform as well as humans on visual recognition. Based on this observation, biologically inspired features (BIF) have been used in computer vision systems to perform tasks such as scene classification and gait recognition which are similar to those which humans have natural ability to carry out. BIF are numerical parameters which are generating by processing an image in a way which mimics the process of cortex for visual perception.

In general terms, the invention proposes dividing at least a portion of the image into sub-regions ("superpixels") each comprising multiple pixels of the image, extracting BIF (and optionally other features) for each of the superpixels, using the features and an adaptive model to generate data indicative of whether each superpixel is within or outside the structure, and smoothing the data to form an estimate of the position of the structure.

Since the BIF are obtained only for each superpixels, the computational load is reduced compared to handling individual pixels. The superpixels are preferably obtained by a clustering algorithm applied to the portion of the image.

In the case that the optic structure is the optic disc, a preliminary step may be to identify part of the image comprising the optic disc, and the method is applied only to that portion of the image.

In the case that the optic structure is the optic cup, and the location of the optic disc is already known (at least approximately), the location of the optic disc is used to identify the portion of the image which is used to locate the optic cup.

The BIF functions are preferably each produced by processing the region using filters which filter the image at a plurality of distance scales, and combining the results. This is because, as described in detail below, many "units" of the visual processing portion of the cortex perform a processing operation which can be modelled by combining outputs of functions generated on different distance scales (that is, levels of resolution). Each of the BIF functions may be generated by performing an operation which models the function of a corresponding one of the units.

Some of the BIF are computed by a set of "centre-surround" operations akin to the visual receptive fields. Typical vision neurons are most sensitive in a small region of the visual space (the centre), while stimuli presented in a broader, weaker antagonistic region concentric with the centre (the surround) inhibit the neuronal response. BIF features which mimic "centre-surround" operations are particularly well-suited to detecting locations which locally stand out from their surround. Centre-surround is implemented in preferred embodiments of the invention as the difference between fine and coarse scales.

Specifically, the operations used to generate the BIF preferably include operations to model:
  intensity units which take values indicative of centre-surround intensity difference; and/or
  colour units which take values indicative of centre-surround difference in a parameter characterizing colour in the image.

Further, the BIF preferably include direction-specific units. Each direction-specific unit corresponds to a single direction in the image. A direction-specific unit for a given sub-region indicates a directionality of that sub-region of the image in the corresponding direction. It is generated using filters which perform a filtering operation to emphasize components (such as edges) having extension in the corresponding direction. The filters may be Gabor filters.

A given direction-specific unit may be produced using a C1 pooling operation, which combines the results obtained for a plurality of distance scales. In other words, for each direction, the filtering may performed successively using parameters which produce different distance scales in the Gabor filters for that direction. Following this filtering, the results at neighbouring distance scales are combined pairwise, to produce a plurality of direction-specific units for that direction.

To classify each superpixel, the adaptive model preferably receives not only the BIF features for that superpixel, but also BIF features from one or more neighbouring pixels. This information allows the adaptive model to use the context of the superpixel, i.e. its relationship of the superpixel with its neighbours.

As well as the BIF features the adaptive model may operate based on other numerical measures (features) characterizing each superpixel.

Firstly, the adaptive model may obtain data characterizing a distribution of a pixel intensity in the superpixel (the pixel intensity may be the intensity of one of the channels of the image, or from a combination of two or more of the channels). This data may be obtained by a histogram equalisation process, which counts the number of pixels in the supercluster for which the pixel intensity is in each of a plurality of predetermined ranges ("bins").

Second, the adaptive model may obtain data characterizing the location of the superpixel. This is particularly important in the case that the structure to be located is the optic cup, since the optic cup is likely to be close to the centre of the optic disc.

Advantageously, the method is able to generate a measure of the reliability with which the optic structure has been located. This is by comparing the discrepancy between successive estimates of the position of the optic structure during the smoothing operation, and in particular the degree to which the estimated position moved during an ellipse-fitting sub-step during the smoothing step.

The invention may be used to perform optic cup and optic disc detection while reducing the workload of medical professionals. These can in turn be used to produce a cup-to-disc ratio (CDR) which is indicative of the presence of medical conditions such as glaucoma. For example, the CDR can be used as a low-cost screening method for identifying individuals for whom further screening should be employed, as a preliminary to a step of intervention to treat myopia or reduce its likelihood of occurrence.

The invention may be expressed as a method. It may alternatively be expressed as a computer system for carrying out the process described above, or a computer program for performing the method (for example stored in non-transitory form on a tangible recording medium, such as an optical disc).

The term "automatic" is used in this document to refer to a process carried out by a computer system substantially without human involvement (except, optionally, for initiation). This is in contract to the term "semi-automatic", which refers to a process which is carried out with human intervention (for example manually indicating a region-of-interest, or specifying a parameter) during the process. The term "computer system" refers to a computer of any type, including a PC, server or mobile device, having a processor and a tangible data storage device for storing non-transitory program instructions for performance by the processor to cause the processor to carry out a method. The computer further has a display device for displaying results of the process, and/or a data interface for transmitting the results of the process outside the computer system.

BRIEF DESCRIPTION OF THE DRAWINGS

Embodiments of the invention will now be described for the sake of example with reference to the following drawings, in which:

FIG. 1 is composed FIGS. 1(a) to 1(f), in which FIGS. 1(a) and 1(d) are fundus images, FIGS. 1(b) and 1(e) are the fundus images respectively annotated with an OD and an outline of PPA, and FIGS. 1(c) and 1(f) are the fundus images annoted with a ground truth OD and a segmented boundary obtained according to a prior art method;

DETAILED DESCRIPTION OF THE EMBODIMENT

First Embodiment: Optic Disc Segmentation

Figure 1:
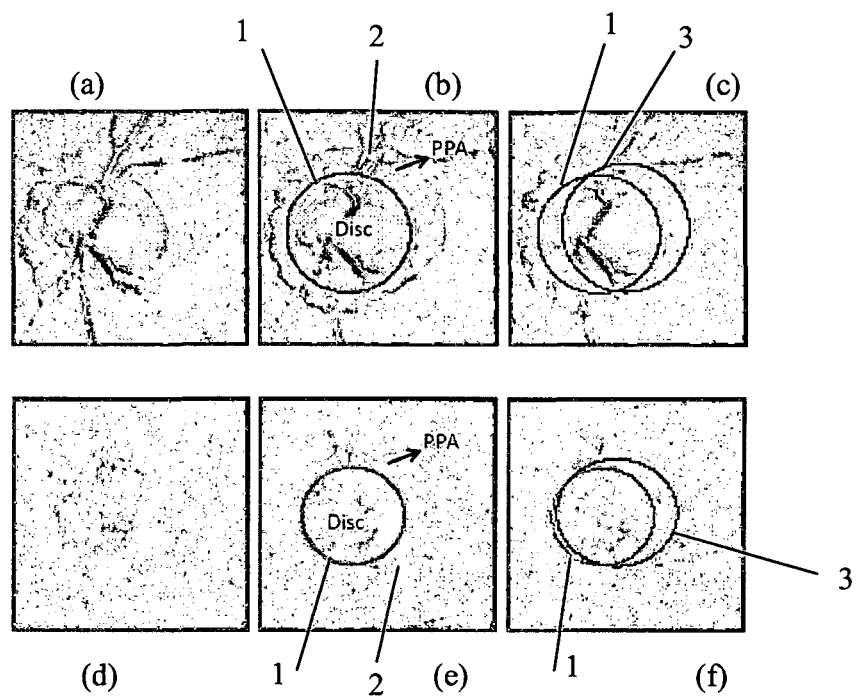
Figure 2:
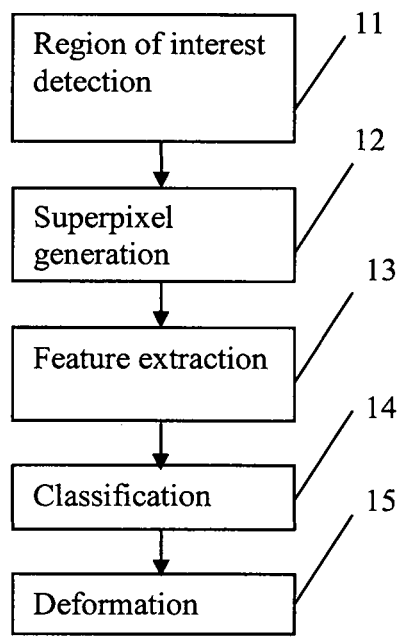
FIG. 2 is a flow diagram showing the steps of a method for optic disc segmentation which is a first embodiment of the invention.

FIG. 2 shows the steps of a method which is a first embodiment of the invention, and which performs OD segmentation. The input to the method is a single two-dimensional retinal fundus image of the eye of a certain individual (or, in variations of the method, multiple fundus images of the eye). In a first step 11, a region of interest is detected by an optic disc localization step. In superpixel generation step 12, the region of interest is divided into sub-regions referred to as "superpixels". In a feature extraction step 13, for each of the superpixels, extended biologically inspired features (eBIF) are computed from 34 biologically inspired feature maps and 5 image maps. In a classification step 14, they are used to classify the superpixels as disc or non-disc, so as to obtain a first partitioning of the region of interest into disc and non-disc sections. In a deformation step 15, deformation is applied to fine tune the disc.

Figure 3:
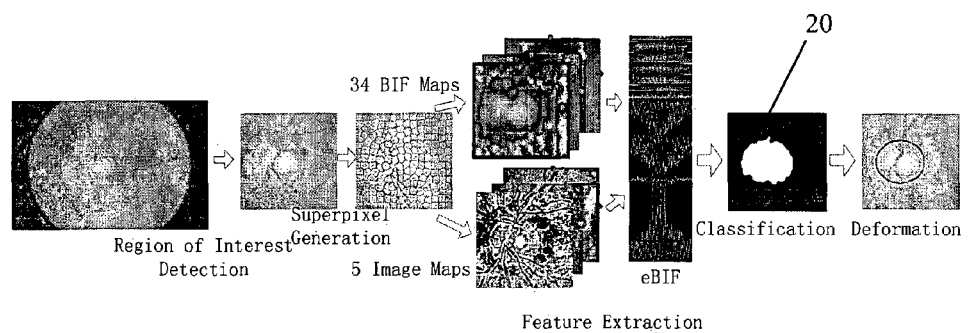
FIG. 3 represents the stages of FIG. 2 schematically.

The process is illustrated schematically in FIG. 3. The column labeled "eBIF" represents the features found in step 13 for a single superpixel. We now turn to a description of how these steps are performed.

First, the region of interest is obtained in step 11. The motivation for performing this step is that extracting the BIF from the whole image would be computational expensive and unnecessary. Thus, the embodiment first finds a region of interest including the optic disc. Various known optic disc localization can be used. In this embodiment, this is done by a process used in U.S. Ser. No. 13/651,309 to perform disc localization. First, the fringe is first trimmed away from the retinal image (as in Z. Zhang, B. H. Lee, J. Liu, D. W. K. Wong, N. M. TAN, J. H. Lim, F. S. Yin, W. M. Huang, and H. Li, "Optic disc region-of-interest localization in fundus image for glaucoma detection in argali," Proc. of Int. Conf. on Industrial Electronics & Applications, pp. 1686-1689, 2010), and then the area with the brightest spot is located.

There is then a thresholding sub-step, in which the embodiment estimates the optic disc using a threshold as follows.

First, the embodiment identifies pixels in the image brighter than a threshold T as the candidate brightest spot. The embodiment applies this threshold only to the red channel of the image since this channel provides a better result than the other channels as it avoids the most gradients of blood vessels. Mathematically, we have:

$$E(x, y) = \begin{cases} 1 & \text{if } I_r(x, y) > T \\ 0 & \text{otherwise} \end{cases} \quad (1)$$

where $I_r$ is the value of red channel at a location (x, y) in the fundus image.

The threshold T is determined as follows. Since different fundus images may have different respective levels of illumination, we determine the threshold T adaptively for each image. This is done in the following. First, we derive an average intensity of the image $\bar{I}_r$. Second, T is set to initialized to a value $\bar{I}_r + \Delta T_0$, where the value of $\Delta T_0$ is set empirically (that is, by trial-and-error).

Thirdly, T is adaptively reduced or increased to a new value $\bar{I}_r + \Delta T$ if the number of pixels greater than T is not within the range of typical optic disc size, i.e., $$\Delta T = \begin{cases} \Delta T_0, & \text{if } D_{min} \leq f(I_r, \bar{I}_r + \Delta T_0) \leq D_{max} \\ \operatorname*{argmax}_{\Delta T} f(I_r, T) \geq D_{min}, & \text{if } f(I_r, \bar{I}_r + \Delta T_0) < D_{min} \\ \operatorname*{argmin}_{\Delta T} f(I_r, T) \geq D_{max}, & \text{if } f(I_r, \bar{I}_r + \Delta T_0) > D_{max} \end{cases} \quad (2)$$

where $f(I_r, T)$ denotes a function to compute the number of pixels in image $I_r$ with pixel values greater than T. $D_{min}$ and $D_{max}$ are two empirically determined threshold values which respectively represent the minimum and maximum number of pixels in a typical optic disc. The following steps are used to implement Eqn. (2):

1) Let $T = \bar{I}_r + \Delta T_0$ and compute $f(I_r, T)$
2) If $f(I_r, T) < D_{min}$, decrease T stepwise until $f(I_r, T) \geq D_{min}$.
3) If $f(I_r, T) > D_{max}$, increase T stepwise until $f(I_r, T) \leq D_{max}$.

Then the largest object, i.e., the largest connected group of pixels, having an intensity above T, is obtained. Its centre is computed as $(\hat{x}, \hat{y})$ and a rectangular region of interest is obtained centered at $(\hat{x}, \hat{y})$ with predetermined size approximately twice of a typical disc diameter. For example, in our experimental implementation of the embodiment we generated a region of interest of 800×800 pixels when starting with a fundus image of size 2048×3072 pixels.

The superpixel generation step 12 is performed using the SLIC (Simple Linear Iterative Clustering) algorithm, which uses k-means to aggregate nearby pixels into superpixels whose boundaries closely match true image boundaries. In summary, in SLIC, k initial cluster centres $C_k$ are sampled on a regular grid spaced by $S = (N/k)^{1/2}$ pixels apart from the image with N pixels. The centres are first moved towards the lowest gradient position in a 3×3 neighborhood. Clustering is then applied. For each $C_k$, SLIC iteratively searches for its best matching pixel from the 2S×2S neighborhood around $C_k$ based on color and spatial proximity and then computes the new cluster centre based on the found pixel. The iteration continues until the distance between the new centres and previous ones is small enough. Finally, a post-processing is applied to enforce connectivity. The algorithm uses only one parameter: the number of superpixels k. In our experimental implementation, we used k=200 in disc segmentation, which was found experimentally to be an acceptable value. Note that in other implementations of the embodiment the superpixels may be obtained in other ways, including ways which do not involve a clustering algorithm.

In step 13, features from superpixels are extracted, so that they can be used in step 14 to classify them as disc or non-disc. Based on the observation that human eye can capture the 'gist' of an image instantly, biologically inspired feature (BIF) maps have been used in computer vision including scene classification, medical imaging and etc. BIFs mimic the process of the cortex for visual perception. Since the ophthalmologists can determine the optic disc boundary based on the visual information, i.e., they can classify each superpixel as disc or non-disc, we introduce BIF to classify superpixels.

BIFs have proven to be effective in computer vision. The features in the present embodiment are obtained using respective 34 feature maps. Each map is produced by a process mimicking the process carried out by a corresponding type of visual processing "unit" within a human cortex. The 34 feature maps include 6 feature maps from intensity units, 12 feature maps from colour units, and 16 feature maps from C1 units. Each feature map has the same size as the region of interest, and is defined at each pixel of the region of interest.

Among these features, the intensity units are obtained by convolving dyadic Gaussian pyramids with the intensity channel of a colour image. The features correspond to the neurons of mammals which are sensitive to dark centres on bright surrounds or vice versa. Nine spatial scales are generated with a ratio from 1:1 (level 0) to 1:256 (level 8). The intensity feature maps are obtained by the centre-surround difference operation between centre levels c=2,3,4 and surround levels s=c+d with d=3, 4. Thus, six feature maps are computed at levels of 2-5, 2-6, 3-6, 3-7, 4-7, and 4-8. Because of the scale difference, maps of surround levels are interpolated to be the same size as the corresponding centre levels, and then they are subtracted to generate the relevant feature maps, i.e., $I(c,s)=|I(c)-f_{s-c}(I(s))|$, where $f_{s-c}$ denotes the interpolation from level s to c. In the above, we compute center surround difference maps using the intensity channel. Alternatively, the embodiment may compute the center surround difference maps from the red, green, blue channels or any other color channel channels. These maps may be used together.

The colour units are inspired by the 'colour double-opponent' system in the cortex. Neurons are excited by a colour (e.g., blue) and inhibited by another colour (e.g., yellow) in the centre of receptive field, and so are neurons in the surround. Herein, four colour channels are used:R=r-(g+b)/2, G=g-(r+b)/2, B=b-(r+g)/2 and Y=r+g-2(|r-g|+b). For each colour channel (R, G, B, and Y), dyadic Gaussian pyramids are used to generate nine spatial scales similar the scales used to generate the intensity units. Two colour pairs R-G and B-Y are used. The feature maps are computed as the across scales centre-surrounding differences. Similar to the computation of intensity units, surround maps are interpolated to be the same size as the corresponding centre maps and their difference is computed: $RG(c,s)=|R(c)-G(c)-f_{s-c}(R(s)-G(s))|$ and $BY(c,s)=|B(c)-Y(c)-f_{s-c}(B(s)-Y(s))|$.

The C1 units are obtained by pooling over S1 units, which correspond to simple cells in S1 layer of the visual cortex. Gabor functions are used as filters for feature extraction due to their similarity to the receptive field profiles in simple cells in S1 cortical layer. The Gabor functions are all self-similar, and are generated from a single "mother function" which can be written as:

$$G(x,y)=\exp(-(x_0^2+\gamma^2 y_0^2)/2\delta^2) \times \cos(2\pi r_0 \lambda)$$

wherein δ and λ are predetermined parameters, $x_0 = x \cos\theta + y \sin\theta$, $y_0 = -x \sin\theta + y \cos\theta$. Each Gabor filter corresponds to specific values of the parameters x, y and θ. The values of x and y decide the scales of the corresponding Gabor filter, and θ controls its orientation. In this embodiment, eight scales with a range of sizes from 7×7 to 21×21 pixels with a step of two pixels are used. For example, for the smallest scale x and y may both be chosen to be equal to 7. Four orientations are considered: θ=0°, 45°, 90°, and 135°. Thus, a total of 32 feature maps are obtained in S1 units. The direction-specific C1 units are obtained by pooling the S1 units with the same value of θ pairwise (i.e. each direction-specific C1 unit is produced by pooling a pair of S1 units with adjacent scales and with an identical orientation). "Pooling" refers to taking the maximum of two values. The pooling is carried out at each point in the space. Thus, for each orientation, we obtain four direction-specific C1 units by pooling respectively the S1 units with the 7-pixel and 9-pixel scales; the 11-pixel and 13-pixel scales; the 15-pixel and 17-pixel scales; and the 19- and 21-pixel scales. Thus, 16 feature maps are obtained in the form of direction-specific C1 units.

To use BIF for superpixel classification, we accumulate information over space in each of image superpixels using the BIF maps. We denote the $i^{th}$ feature map by $M_i$, where i=1,2, . . . , 34. For the $j^{th}$ superpixel $SP_j$, the feature $u_j$ is a 34-dimensional vector computed as the mean:

$$u_j(i) = \frac{1}{n_j} \sum_{(x,y) \in SP_j} M_i(x, y)$$

where $n_j$ is the number of pixels belongs to $SP_j$. Here, the first moment mean is used. Alternatively or additionally, the embodiment may compute and include higher order moments such as variance, skewness, kurtosis as additional features.

Since the classifications of neighbouring superpixels are highly correlated, the context features from neighbouring superpixels should also be considered in the classification of each superpixel. The embodiment includes a search for four neighbouring superpixels for $SP_j$ and denotes them as $SP_{j_1}$, $SP_{j_2}$, $SP_{j_3}$, $SP_{j_4}$. For a given superpixel $SP_j$, $SP_{j_1}$ is determined as the first superpixel which is encountered by moving out of $SP_j$ from the centre of $SP_j$ horizontally to the left. Similarly, $SP_{j_2}$, $SP_{j_3}$ and $SP_{j_4}$ are determined by moving out to the right, up and down respectively. Then the BIF feature for $SP_j$ would be computed as: $BIF_j = [u_j \, u_{j_1} \, u_{j_2} \, u_{j_3} \, u_{j_4}]$, which has 34×5=170 dimensions.

A limitation of existing BIF is that it does not consider the contrast variation due to illumination changes. However, a human eye is capable of this. In the embodiment, a histogram of each superpixel is used for the same purpose. This is equivalent to applying contrast enhancement to the image. It is motivated by the use of histogram equalization in biological neural networks. In such networks, histogram equalization maximizes the output firing rate of the neuron as a function of the input statistics. In this embodiment, histogram equalization is applied to red r, green g, and blue b channels respectively to enhance the contrast among images for easier analysis. However, histogram equalisation on the r, g, and b channels may yield dramatic changes in the image's colour balance. Thus, hue h and saturation s from HSV colour space are also included to form 5 image maps. The histogram of each superpixel is computed from the five channels including the histogram equalized r, g, b as well as the original h, s. In our experimental implementation of the embodiment, 256 bins are used (a value which was chosen since there were a maximum of 256 values in the r, g and b values for a given pixel; note that in other implementations the number of bins may be smaller, but if it is too small some information will be lost). A 256×5=1280 dimension feature $HIST_j$ is computed for $SP_j$. The embodiment combines $HIST_j$ with the $BIF_j$ to form the proposed extended biologically inspired feature $eBIF_j=[BIF_j \; HIST_j]$.

Optionally, histograms from neighbouring superpixels can also be included. However, experimentally we found the improvement is minimal as we already have context features in $BIF_j$. On the other hand, the feature dimensionality increases rapidly to include more histogram features.

We now turn to the classification step 14. This was performed using an adaptive model, such as a support vector machine (SVM). The experimental implementation of the embodiment used LIBSVM (a publically available Library for Support Vector Machines) with a linear kernel. The SVM was trained by supervised learning, using a training set which was eBIFs from a number of superpixels which had been determined by an ophthalmologist to be in the optic disc, and from an equal number of superpixels which the ophthalmologist had determined not to be in the optic disc.

One challenge to get a good classifier is that there are multiple types of region outside the optic disc. For example, some regions outside the optic disc display PPA and some do not. The regions displaying PPA look rather similar to the optic disc. The training may be less successful if there are different numbers of superpixels for each type of region. If the classifier is trained using many fewer superpixels from PPA regions compared with other non-disc regions, the trained classifier may be less, successful at distinguishing between the optic disc and a region with PPA. To overcome the problem, we adopt a bootstrap strategy. After a classifier is obtained, examples that are misclassified are added back to the training set to train a new classifier. By iteratively adding misclassified samples, examples that are misclassified gain weight and examples that are classified correctly lose weight. We repeat the iteration until there is no improvement in the classification accuracy or the maximum iterations have been reached.

Figure 4:
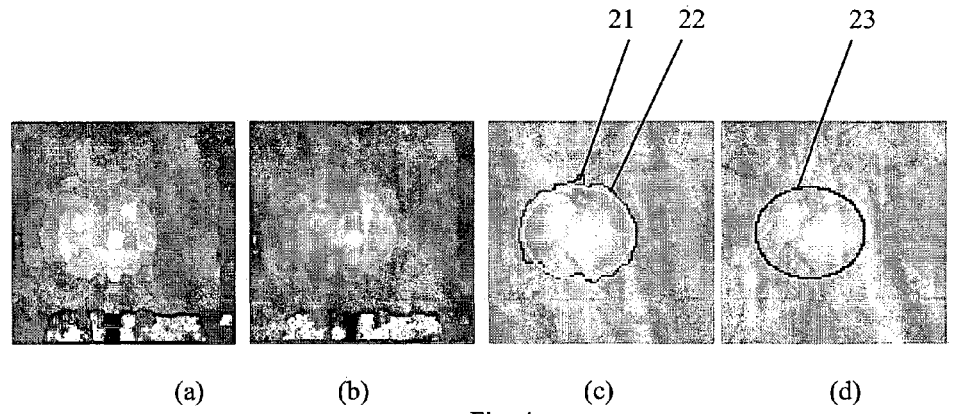
FIG. 4, which is composed of FIGS. 4(a) to 4(d), shows stages during the process of FIG. 2.

After that, the trained classifier is used to classify the superpixels from test images. Instead of using the binary classification results from LIBSVM, the decision values from LIBSVM are used ("decision value" means the value which is thresholded by the SVM to produce the output of the SVM). This produces one decision value per superpixel. Each pixel in the superpixel is then allotted the same decision value. FIG. 4(*a*) illustrates this. Each of the irregular regions of FIG. 4(*a*) corresponds to a respective one of the superpixels, and the decision value of the pixels in this superpixel is shown by as a grey-scale value.

Following this, a smoothing filter is applied on the decision values to produce smoothed decision values. In our experiments, a mean filter and a Gaussian filter were tested, and the mean filter was found to work well. FIG. 4(*b*) illustrates the application of this filter to the image of FIG. 4(*a*).

Then the smoothed decision values are used to get binary decisions for all pixels. This was done by thresholiding using an identical threshold at each pixel. In our experimental implementation the threshold used was the default one in the SVM. The threshold is the default one in SVM. For example, if we have assigned the positive and negative samples as +1 and −1, then the threshold is $((+1)+(−1))/2=0$. We use 0 in our implementation. Optionally, this threshold can also be slightly tuned to have a bias toward positive or negative samples.

The largest connected object is obtained (shown as 20 in FIG. 3) and its boundary is used as the raw estimate of the position of the optic disc. Smoothing is now performed.

First, an elliptical Hough transform is performed, and used to find the ellipse which best fits this raw estimate. This is illustrated by FIG. 4(*c*) where the line 21 indicates the raw estimate, and the line 22 illustrates the fitted ellipse.

Then, in step 15, a deformable model is used to fine tune the boundary using the fitted estimation as initial contour. The algorithm used was the one in Yin, F., Liu, J., Ong, S. H., Sun, Y., Wong, D. W. K., Tan, N. M. and Cheung, C., Baskaran, M., Aung, T., and Wong, T. Y.: Model-based Optic Nerve Head Segmentation on Retinal Fundus Images, Int. Conf. of IEEE Eng. in Med. and Bio. Soc., pp. 2626-2629. (2011)) FIG. 4(*d*) illustrates the result of this as the line 23.

As the OD is often an ellipse, the raw estimate of the boundary should be close to the result of the ellipse-fitting sub-step if the superpixel classification based segmentation worked well. Otherwise, the result is likely to be less reliable. Inspired by this, we propose to compute a reliability score for the segmentation. Define the set of points from the raw estimation as X (i.e. line 21 in FIG. 4(*c*)) and the set of points from the fitted estimation as Y=f(X) (i.e. line 22 in FIG. 4(*c*)). For each point x in X, we find its nearest point in Y and their distance is computed as $$d_f(x) = \inf\{d(x,y) | y \in Y\}$$

where inf represents the infimum and d(x,y) the Euclidean distance between x and y. Then, the reliability score r is computed as the ratio of the number of x with $d_f(x)<T$ to the total number of x, i.e., $$r(X) = \frac{\text{Card}(\{x \mid d_f(x) < T, x \in X\})}{\text{Card}(X)},$$

where the Card(Z) is the operator to get the cardinality of the set Z, and T is an empirically determined threshold.

Second Embodiment: Optic Disc Segmentation

The optic cup is a central portion of the optic disc. Very few methods have been proposed for optic cup segmentation from 2-D images. Some of the present inventors have proposed the AGALI and AGLAIA techniques, which included thresholding followed by deformation methods. Because in many images there is no change of intensity at the optic cup boundary, additional information has been used, such as seeking small vessel bends ("kinks") which anatomically mark the cup boundary. However, correct identification of kinks presents a challenge, and some retinal images do not exhibit kinks.

Figure 5:
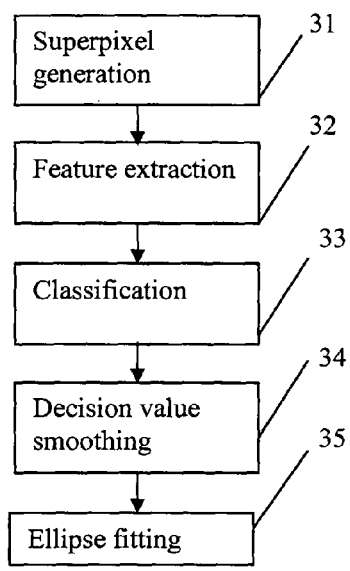
FIG. 5 is a flow diagram showing the steps of a method for optic cup segmentation which is a second embodiment of the invention.
Figure 6:
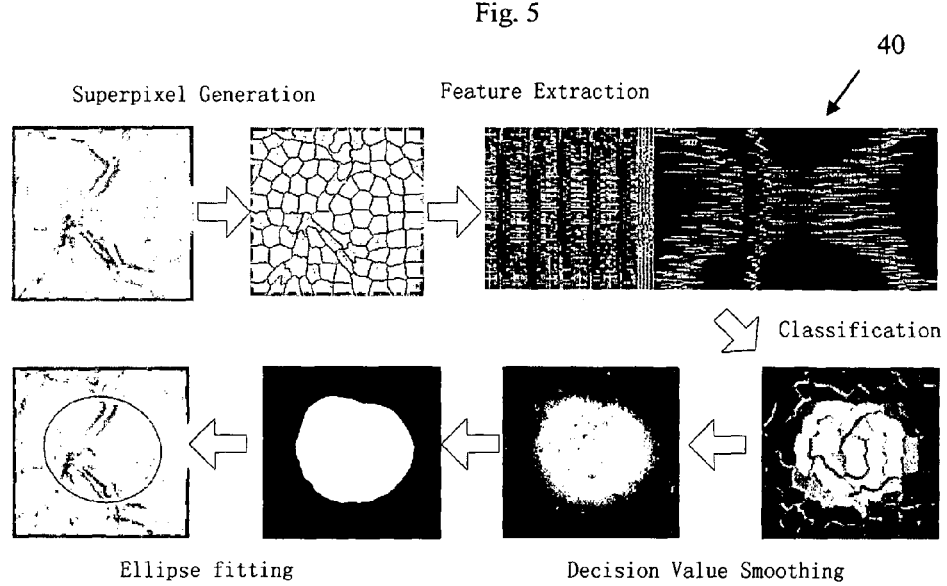
FIG. 6 represents the stages of FIG. 5 schematically.

The second embodiment of the invention employs a superpixel-based approach for optic cup segmentation. The procedures for the superpixel-classification-based the optic cup segmentation are similar to those for optic disc segmentation and summarized in FIG. 5, and FIG. 6 shows schematically the data produced at each stage of the process. The cup segmentation may be done after the optic disc segmentation, taking as its input a portion of the image which was identified using the first embodiment as comprising the optic disc. The estimated positions of the optic cup and optic disc resulting from the use of the embodiments may be used to produce an estimate of the cup-to-disc ratio (CDR), which in turn can be used, optionally in combination with other factors, to determine whether the individual should be subject to further testing, leading eventually to the diagnosis of a condition such as glaucoma, and possible treatment of the individual.

The second embodiment receives the estimated position of the optic disc obtained using the first embodiment. The second embodiment determines the minimal rectangular portion of the image which contains the estimated optic disc.

As shown in FIG. 5, the first step 31 of the method is that this rectangular portion of the image is divided into superpixels using the clustering algorithm. In this case, in our experimental implementation the parameter k was chosen to be 100 (superpixels for cup segmentation are obtained only from the disc region, and a smaller k is thus preferably used than the k=200 superpixels used when segmenting the disc itself). This value of k was found experimentally to be acceptable.

In step 32, features are computed for each superpixel. The feature extraction is similar to that for optic disc segmentation and described below. The features are represented schematically as the area 40 in FIG. 6, and each row of the area 40 corresponds to the feature for respective superpixel.

For each of the superpixels, the same biologically inspired feature is computed as in the first embodiment of the invention, and this is denoted by $BIF_j = \lfloor u_j \, u_{j_1} \, u_{j_2} \, u_{j_3} \, u_{j_4} \rfloor$ using the same notation as before. The histogram feature is computed in the same way as in the first embodiment, except that the histogram from the red channel is no longer used. This is because there is little information about optic cup from the red channel. The histogram from the blue channel is optional as the green channel is the one with most cup information. In our experimental implementation of the second embodiment, the blue channel is also excluded and the histogram $HIST_j^c$ for cup segmentation is a 256×3=768 dimensional feature. Note that it is possible to re-use the feature maps previously derived during the optic disc segmentation again to reduce computational cost. Alternatively, we can compute the features following the exactly same procedure for optic disc segmentation, except that the input image is changed from the previous region of interest image to the portion of the original image comprising the estimated position of the optic disc (the "disc image"). The advantage of computing the features from the disc image is that most noise outside the disc has been removed.

In addition to $BIF_j$ and $HIST_j^c$, prior knowledge of optic cup is used to aid the optic cup segmentation. We notice that optic cups are usually at the centre part of the optic disc. Accordingly, the distance $D_j$ between the superpixel and the centre of the disc centre is used as an additional feature: "a location feature". In our implementation, we used the centre of the superpixel as its location. Thus, the feature for optic cup segmentation is computed as $eBIF_j^c = [BIF_j \; HIST_j^c \; D_j]$.

In step 33, all these features (i.e. the 34 biologically inspired feature maps, the 3 image maps and locations of superpixels) are used to classify the superpixels as cup or non-cup. A LIBSVM with linear kernel is used as the classifier. Again there was a supervised learning process using training examples which were superpixels classified by an ophthalmologist. We used an equal number of training examples which were classified as being from the cup and neuroretinal rim region (non-cup). Note that these superpixels are all within the disc region obtained in the first embodiment (the top left image of FIG. 6), so the training examples are not those used in the first embodiment. Similarly, the feature maps are defined extend over the disc region, rather than over the whole region of interest used in the first embodiment. As in the first embodiment, instead of using the binary classification result from LIBSVM as the estimate of the position of the optic cup, the decision value from the LIBSVM for each superpixel is computed. Each pixel in the superpixel is allotted this decision value.

In step 34, a smoothing filter is applied to the decision values to get smoothed decision values. In our experimental studies, a mean filter was used. Then the smoothed decision values are used to obtain binary decisions for all pixels. The largest connected object is obtained and its boundary is used as the raw estimate of the position of the optic cup.

In step 35, the ellipse which best fits the raw estimate of the position of the cup is computed (this was performed using the algorithm described in A. Fitzgibbon, M. Pilu, and R. B. Fisher, "Direct least squares fitting of ellipses," *IEEE Trans. Pattern Anal. Mach. Intell.*, vol. 21, no. 5, pp. 476-480, May 1999.), and this is the optic cup boundary resulting from the second embodiment.

What is claimed is:

1. A method of locating within an image of an eye an outline of an anatomical optic structure, said anatomical optic structure being the optic disc of the eye or the optic cup of the eye, the method comprising:
   (i) dividing a portion of the image of the eye into a plurality of sub-regions, each sub-region being a respective set of a plurality of pixels of the portion of the image;
   (ii) subjecting the portion of the image to respective processing operations, to generate a plurality of feature maps;
   (iii) for each sub-region, deriving a plurality of numerical measures using the feature maps;
   (iv) using the plurality of numerical measures and an adaptive model, to produce data indicative of which of the sub-regions of the image are respectively part of, or not part of, said optic structure; and
   (v) performing at least one smoothing operation to obtain the outline of said optic structure using the data, said at least one smoothing operation comprising an ellipse-fitting sub-operation;
   wherein the method further includes an operation of generating an estimate of the reliability of the identification of the location of the optic structure, by measuring a difference between successive estimates of the position of the optic structure before and after the ellipse-fitting sub-operation during said at least one smoothing operation.

2. A method according to claim 1, comprising an operation of deriving the portion of the image as a region-of-interest comprising the optic disc of the eye, said optic structure being the optic disc.

3. A method according to claim 1 in which the portion of the image is a part of the image corresponding to at least part of an estimated optic disc of the eye, said optic structure being the optic cup.

4. A method according to claim 1 in which the at least one smoothing operation includes, for each sub-region, allotting a corresponding decision value to all pixels of the sub-region, and then smoothing an image composed of the decisions values of the pixels of the portion of the image to produce a smoothed image.

5. A method according to claim 4 in which the smoothed image is subjected to a thresholding operation, and an operation of finding the largest connected component of the result of the thresholding operation, the largest connected component being an estimate of the position of structure.

6. A method according to claim 1 in which one of said smoothing operations is performed using an elliptical Hough transform, to find an ellipse which best fits an estimate of the position of the structure.

7. A method according to claim 6 in which the output of the Hough transform is subject to a deformation operation.

8. A method according to claim 1 in which in operation (iv) said data for each sub-region is obtained by a process including inputting the numerical measures for that sub-region, and the numerical measure for each of a plurality of neighboring sub-regions, into the adaptive model.

9. A method according to claim 1 which further includes for each sub-region determining the number of pixels for which an intensity value falls into each of a plurality of ranges, said numbers being comprises within said numerical measures used by the adaptive model.

10. A method according claim 1 in which at least some of the plurality of numerical measures are obtained using:
intensity feature maps obtained by convolving intensity filters with the portion of the image;
colour feature maps obtained by convolving colour filters with the portion of the image; and/or
direction-specific feature maps, each direction-specific features map being obtained by pooling the results of filtering the portion of the image using a plurality of direction-specific filters which filter the portion of the image in the same direction but at different distance scales.

11. A method according to claim 1, in which at least some of the plurality of numerical measures for each sub-region model:
intensity units which produce a value indicative of an average over the sub-region of a centre-surround intensity difference;
colour units which produce a value indicative of an average over the sub-region of a centre surround colour difference; and/or
direction-specific units which produce a value using filters which, for each of said direction-specific units, perform a filtering operation in a corresponding direction.

12. A method according to claim 11 in which there are a plurality of the intensity units, each intensity unit being modelled by forming an average over the sub-region of the magnitude of a difference I (c,s) between a first intensity function and a second intensity function, each of the intensity functions being defined over the image, and the second intensity function being obtained by sampling the first intensity function and interpolating values between the samples.

13. A method according to claim 11 in which the derivation of the numerical measures modelling the intensity units comprises:
convolving dyadic pyramids with the intensity channel of a colour image, to generate a plurality of intensity functions I(c), the intensity functions being labelled by an integer index c which takes values greater than 2 and represents of a corresponding scale in the image.

14. A method according to claim 11 in which there are a plurality of said numerical measures modelling colour units and obtained by:
using dyadic Gaussian pyramids and a colour function obtained from the image, to generate modified colour functions on a plurality of respective distance scales, obtaining each numerical measure by forming an average over the sub-region of the magnitude of a difference between a first said modified colour function and a second said modified colour function, the first and second modified colour functions having different respective said distance scales.

15. A method according to claim 11 in which said numerical measures modelling direction-specific units are derived by, for each of a plurality of directions:
filtering said image using a plurality of filters which each perform a filtering operation in that direction, the plurality of filters having different respective distance scales; and
pooling results of said filtering obtained using pairs of said filters.

16. The method according to claim 15 in which said filters are Gabor filters, the distance scale for each filter being a distance parameter used to define the corresponding filter using a Gabor mother function.

17. The method according to claim 1 in which the sub-regions are obtained by a clustering algorithm.

18. A method for obtaining a CDR ratio of an eye from at least one image of the eye, the method including:
(i) deriving estimates of the location of an optic cup and an optic disc in the at least one image of the eye by a process comprising:
(a) for each of the optic cup and optic disc generating a respective set of sub-regions of the at least one image,
(b) subjecting the at least one image to respective processing operations, to generate a plurality of feature maps, and from the feature maps obtaining numerical measures for the sub-regions of the eye;
(c) using the plurality of numerical measures and respective adaptive models, to produce data indicative of which of the sub-regions are part of the optic disc and optic cup; and
(d) using the data to form the estimates of the locations of the optic cup and optic disc which including performing at least one smoothing operation to obtain the outline of the optic cup and optic disc using the data, said at least one smoothing operation comprising an ellipse-fitting sub-operation; wherein the method further includes, for at least one of the optic cup and optic disc, an operation of generating an estimate of the reliability of the identification of the location of the optic cup or optic disc, by measuring a difference between successive estimates of the position of the optic cup or optic disc before and after the ellipse-fitting sub-operation during said at least one smoothing operation; and
(ii) using the estimates of the locations of the optic cup and optic disc to compute the cup-to-disc ratio (CDR).

19. A method for treating an eye, the method including:
(i) deriving estimates of the location of an optic cup and an optic disc in at least one image of the eye by a process comprising:
(a) for each of the optic cup and optic disc generating a respective set of sub-regions of the at least one image, each sub-region being a respective set of a plurality of pixels of the at least one image;
(b) subjecting the at least one the image to respective processing operations, to generate a plurality of feature maps, and from the feature maps obtaining numerical measures for the sub-regions of the eye;
(c) using the plurality of numerical measures and respective adaptive models, to produce data indicative of which of the subregions are part of the optic disc and optic cup; and
(d) using the data to form the estimates of the locations of the optic cup and optic disc which including performing at least one smoothing operation to obtain the outline of the optic cup and optic disc using the data, said at least one smoothing operation comprising an ellipse-fitting sub-operation; wherein the method further includes, for at least one of the optic cup and optic disc, an operation of generating an estimate of the reliability of the identification of the location of the optic cup or optic disc, by measuring a difference between successive estimates of the position of the optic cup or optic disc before and after the ellipse-fitting sub-operation during said at least one smoothing operation;

(ii) using the estimates of the locations of the optic cup and optic disc to compute a cup-to-disc ratio (CDR); and (iii) using said CDR in a decision of whether the eye exhibits glaucoma; and (iv) in the case that the decision is positive treating the eye.

20. A computer system having a processor and a tangible data storage device, the data storage device storing non-transitory program instructions for performance by the processor to cause the processor to locate an outline of an anatomic optic structure within an image of an eye, said anatomical optic structure being the optic disc of the eye or the optic cup of the eye, by:

(i) dividing a portion of the image of the eye into a plurality of sub-regions by a clustering algorithm, each sub-region being a respective set of a plurality of pixels of the portion of the image;

(ii) subjecting the portion of the image to respective processing operations, to generate a plurality of feature maps;

(iii) for each sub-region, deriving a plurality of numerical measures using the feature maps;

(iv) using the plurality of numerical measures and an adaptive model, to produce data indicative of which of the sub-regions of the image are respectively part of, or not part of, said optic structure; and (v) performing at least one smoothing operation to obtain the outline of said optic structure using the output of the adaptive model, said at least one smoothing operation comprising an ellipse-fitting sub-operation;

(vi) wherein the non-transitory program instructions are operative to cause the processor to generate an estimate of the reliability of the identification of the location of the optic structure, by measuring a difference between successive estimates of the position of the optic structure before and after the ellipse-fitting sub-operation during said at least one smoothing operation.

* * * * *